United States Patent [19]

Neil

[11] 4,397,520
[45] Aug. 9, 1983

[54] AFOCAL REFRACTOR TELESCOPES
[75] Inventor: Iain A. Neil, Glasgow, Scotland
[73] Assignee: Barr & Stroud Limited, Glasgow, Scotland
[21] Appl. No.: 237,981
[22] Filed: Feb. 25, 1981
[30] Foreign Application Priority Data
Mar. 5, 1980 [GB] United Kingdom ............... 8007407
[51] Int. Cl.³ ..................... G02B 1/02; G02B 9/10; G02B 23/00
[52] U.S. Cl. .................... 350/1.4; 350/1.2; 350/481; 350/564
[58] Field of Search ............... 350/1.4, 1.2, 1.3, 1.1, 350/8, 410, 481, 480, 457, 453, 537, 560, 570

[56] References Cited
U.S. PATENT DOCUMENTS

| | | | |
|---|---|---|---|
| 2,865,253 | 12/1958 | Thielens | 350/1.4 |
| 3,622,218 | 11/1971 | Kruger | 350/1.2 |
| 3,674,330 | 7/1972 | Strong | 350/1.4 |
| 3,825,315 | 7/1974 | Altman et al. | 350/1.3 |
| 3,947,084 | 3/1976 | Noyes | 350/1.3 |
| 4,199,217 | 4/1980 | Rogers | 350/1.4 |

OTHER PUBLICATIONS
Klee, H. W., & M. W. McDowell, *Optical Eng.*, vol. 19, No. 5, Oct. 1980, pp. 748-752.

*Primary Examiner*—Jon W. Henry
*Attorney, Agent, or Firm*—Mason, Fenwick & Lawrence

[57] ABSTRACT

An afocal refractor telescope (10) is formed by a fixed focus achromatic objective system (11) and a fixed focus eyepiece system (12) aligned on a common optical axis (13), the objective system (11) being formed by two lens elements (C, D) and the eyepiece system (12) being formed by two lens elements (A, B), each of the four lens elements (A, B, C, D) being made of a material which has a useful spectral bandpass in the infrared wavelength region, and having refractive surfaces (1,2,3,4,5,6,7,8) intercepting the optical axis (13) which are substantially spherical, lens element (c), which is proximal the eyepiece system (12) being color corrective, with a V-value not less than 120, negatively powered and having a lower refractive index than lens element (D) which is positively powered. Conveniently lens element (C) is made of Chalcogenide glass and each of lens elements (A, B and D) is made of germanium.

8 Claims, 1 Drawing Figure

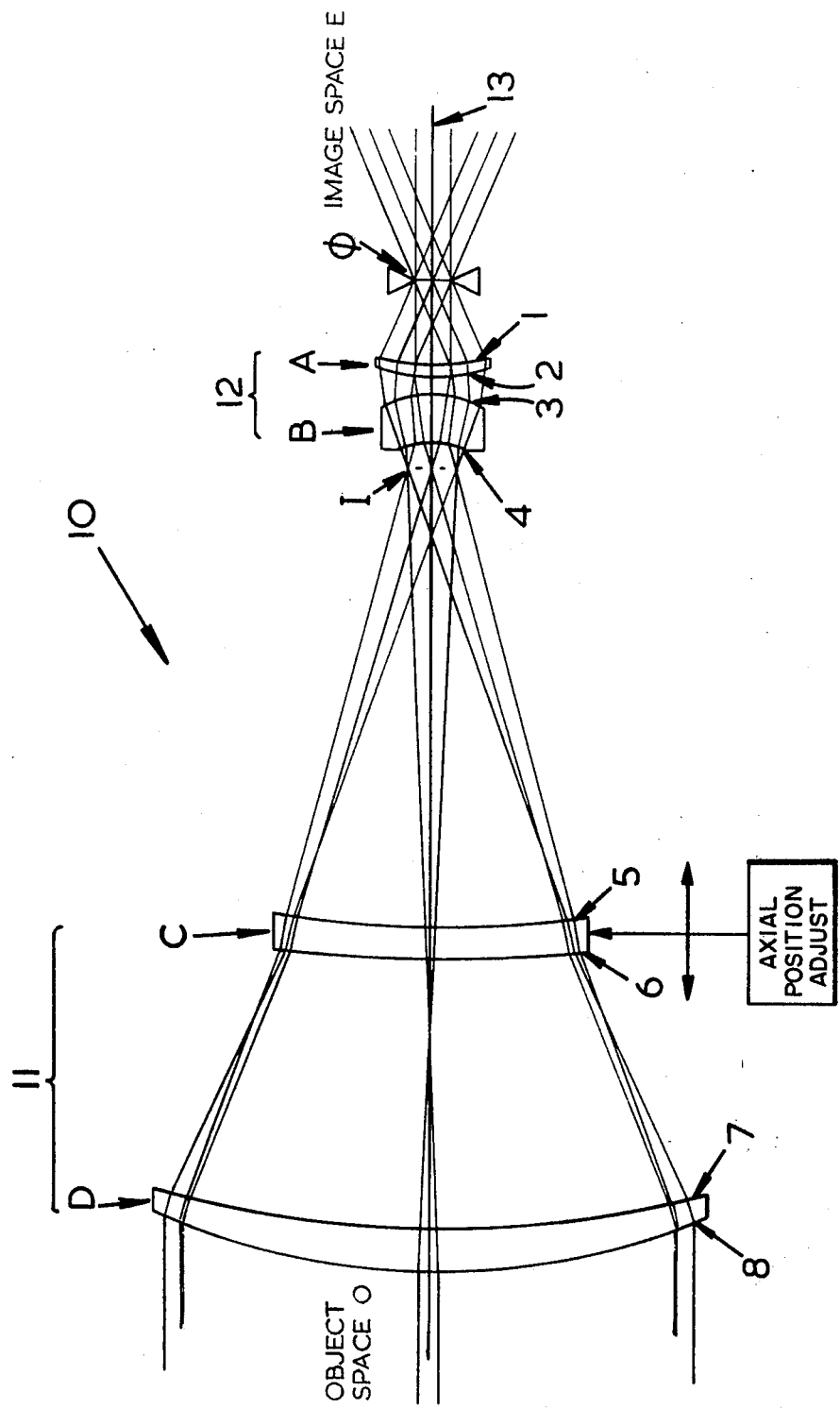

AFOCAL REFRACTOR TELESCOPES

This invention relates to afocal refractor telescopes.

The arrival of high performance 'forward looking infrared systems' (commonly known by the acronym FLIR) has led to a demand for high performance afocal telescopes suitable for use with the FLIR system. Various forms of such telescopes have been previously proposed but the practical requirement for compactness (i.e. short overall length) has imposed a requirement for low pupil aberration. This has proved difficult to achieve without considerable optical and mechanical complexity in a refractor system. Catadioptric telescope systems with the required degree of compactness have been designed but these tend to be complex and additionally suffer from central obscuration which is disadvantageous.

According to the present invention we provide an afocal refractor telescope formed by a fixed focus achromatic objective system and a fixed focus eyepiece system aligned on a common optical axis and arranged to provide an internal real image, said objective system being formed by two lens elements and said eyepiece system being formed by two lens elements, each of the four lens elements being made of a material which has a useful spectral bandpass in the infrared wavelength region, and having refractive surfaces intercepting said optical axis which are substantially spherical, that one of the objective system lens elements which is proximal the eyepiece system being colour corrective, with a V-value or "reciprocal dispersive power" (as customarily used in the art and discussed and used, for example, in *Aberrations of The Symmetrical Optical System*, by W. T. Welford, published by Academic Press, 1974, Library of Congress catalog card No.: 745674, in the portions of Chapter 9 thereof at pages 172–177) of not less than 120, negatively powered, and having a lower refractive index than the other objective system lens element which is positively powered.

Because the telescope of the present invention is of the refractor type there is no obscuration of the field of view; with only four lens elements the system is optically and mechanically simple; with all refractive surfaces substantially spherical the lens elements are easy to manufacture; and because the objective system is colour corrected the telescope can be made compact with a performance near the diffraction limit over a wide range of magnifications.

The colour correcting lens element of the objective system may be a Chalcogenide glass such as that sold by Barr and Stroud Limited under their designation 'Type 1 Chalcogenide Glass', whereas each of the other three lens elements may be made of germanium (which has a V-value of 1182 and a refractive index of 4.003), all of which materials have a useful spectral bandpass in the 3–13 micron infrared wavelength region. Alternatively, the colour-correcting lens element may be made from one of the materials recited in Table V.

The colour correcting lens element may be fixedly mounted with respect to the other lens elements but conveniently it is movable along the optical axis as a result of which the telescope can be compensated for changes in ambient temperature which produce a shift in position of the real image formed within the telescope. Also, such movement of the colour correcting lens element can be utilised to vary the focus of the telescope (without departing from its so-called 'afocal' nature) provided that the real image formed within the telescope is not of high quality. This is conveniently achieved when the colour-correcting lens element is of low optical power since minimal magnification change is produced when this element is moved.

Embodiments of the present invention will now be described by way of example with reference to the accompanying schematic drawing and tables.

As is shown in the drawing a telescope 10 is formed by an objective system 11 and an eyepiece system 12 aligned on a common optical axis 13. The telescope 10 is of the afocal refractor type and internally forms a real image I of radiation entering the telescope from object space O. The objective system 11 is formed by a primary lens element D and a secondary lens element C, the latter being negatively powered (i.e. divergent) and colour corrective whereas the former is positively powered (i.e. convergent). Element C has refractive surfaces 5,6 and element D has refractive surfaces 7,8. The eyepiece system 12 is formed by positively powered lens elements A,B with respective refractive surfaces 1,2 and 3,4. Elements A and B together form a fixed focus system and elements C and D also form a fixed focus system so that the objective system 11 accepts a bundle of parallel rays from an entrance pupil formed in the object space O and the eyepiece system 12 collects radiation from the inverted real image I formed by the objective system 11 and produces a bundle of parallel rays which form an exit pupil $\phi$ in an image space E. The optical power of and the spacing between the various lens elements A,B,C,D is arranged such that the image I lies between refractive surfaces 5 and 3.

The refractive surfaces 1, 2, 3, 4, 5, 6, 7 and 8 are each substantially spherical i.e. if they are not truly spherical they are 'spherical' within the meaning of the art.

The telescope 10 is designed for use in the infrared wavelength region (i.e. 3–13 microns) and consequently the refractive indices of the lens elements are relatively large but in order to provide sufficiently high optical performance lens element C is colour corrective with a V-value of 120 or greater, has a lower refractive index than element D and is negatively powered. This is achieved for the 8–13 micron range by making lens elements A, B and D of germanium, the refractive index of which is 4.0, and lens element C of Barr and Stroud type 1 Chalcogenide glass, the refractive index of which is 2.49, measured at a temperature of 20° C. and at a wavelength of 10 microns. In this case element C has a dispersive capacity, or V-value, of about 150 where the V-value is calculated as the ratio of the refractive index at 10 microns minus 1 to the refractive index at 8.5 microns minus the refractive index at 11.5 microns. These materials (which are suited to being anti-reflection coated) also provide a telescope with at least 60% transmission of incident radiation in the 8.5 to 11.5 micron range when anti-reflection coated.

The lens element C is preferably movable along the optical axis 13 whereas the other lens elements A, B and D are not and this permits compensation of the telescope against movements in the position of the image I induced by ambient temperature changes typically within the range 0°–40° C. Alternatively for a fixed position of the image I the telescope can be focussed on distant objects, typically within the range 100 meters to infinity. Also, the slight telephoto format of the objective system 11 produces internal f-numbers of less than 2.0 in the airspace between lens elements C and D and in the air space between lens elements B and C.

One example of the telescope 10 is detailed in Table I wherein the radius of curvature of each refractive surface is given together with the aperture diameter of each surface and of the pupil φ, the position of which is used as a datum from which the separation of successive refractive surfaces is defined, together with the nature of the material relevant to such separation interval. Thus, for example, surface 5 has a radius of curvature of 549.66 millimeters, the negative sign indicating that the centre of curvature is to the right hand side of surface 5; it is separated by an air space of 207.56 millimeters from the preceding surface, No. 4, in the direction of the pupil φ; it has an aperture diameter of 128.30 millimeters; and is separated from the succeeding surface, No. 6, by a distance 12.50 millimeters in a Barr and Stroud type 1 Chalcogenide glass. This telescope produces a magnification of X14, and has internal f-numbers of approximately 1.18 and 1.64 in the air spaces between the lens elements C and D and C and B respectively. Colour correction is maintained over the 8.5 to 11.5 micron range and with element C movable focussing and thermal compensation is available over the ranges 80 meters to infinity and 0°–40° C. respectively with minimal degradation in overall performance. For practical purposes, if the performance degradation is acceptable, the range for focus and thermal compensation can be increased to 5 meters to infinity and −30°–+70° C. respectively. Specific values of image quality for this telescope are given in Table II.

The telescope detailed in Table I is one of a family which can be constructed utilising a common fixed focus eyepiece system 12. Thus telescopes with magnifications in the range X5.6 to X31.5 can be constructed from the information given in Table 1 (which is for a X14 magnification telescope). By selecting a magnification scale factor within the range 0.40 to 2.25 with which to multiply X14 to give the desired telescope magnification, the telescope can be constructed by scaling the radius of curvature and the separation of the objective system elements and by modifying the separation of surface 5 from the position of image I by the same factor. For this family of telescopes the previously mentioned internal f-numbers will be <1.24 and <1.72 respectively.

A further example of the telescope 10 is detailed in Table III which has a magnification of X16 and performance values as detailed in Table IV. This telescope has a diameter of pupil φ of 11.3 mm and internal f-numbers of 1.34 and 1.86 respectively, and again is one of a family of telescopes which can be constructed with a common fixed focus eyepiece system. This family has a scale factor within the range 0.55 to 2.65 which produces a magnification range of X8.8 to X41.6 in each case the internal f-numbers being <1.34 and <1.86 respectively.

The telescopes which have been described provide high performance over at least two-thirds of the full field with a primary objective aperture diameter enlarged by less than 12% to accommodate pupil aberrations and the overall telescope length is relatively short. In the first example the distortion at maximum field angle is about 0.8% and the objective aperture oversizing is about 7.3% whereas for the second example the corresponding distortion is about 1.3% and the objective aperture oversizing is about 11.2%. Also, there is no vignetting at any of the refractive surfaces of the lens elements. The colour correcting lens element need not be made of BS1 Chalcogenide glass but may be made of any of the materials listed in Table V and it will be noted that due to the radius of curvature of surface 3 the telescopes when coated with high transmission, low reflection anti-reflection coatings, such as Barr & Stroud ARG3, can be combined with a FLIR system without introducing any noticable narcissus effect.

The data given in Tables I–IV are for telescopes focussed at large distances (infinity) at 20° C.

TABLE I

| Lens | Surface | Separation | Radius of Curvature | Material | Aperture Diameter |
|---|---|---|---|---|---|
| Entrance Pupil* | φ | 0 | Flat | Air | 15.50 |
| A | 1 | 36.00 | −169.06 | Air | 46.31 |
|   | 2 | 5.74 | −77.22 | Ge | 47.77 |
| B | 3 | 7.60 | 44.96 | Air | 42.83 |
|   | 4 | 20.20 | 32.77 | Ge | 27.37 |
| C | 5 | 207.56 | −549.66 | Air | 128.30 |
|   | 6 | 12.50 | −1440.92 | As/Se/Ge(BSI) | 133.76 |
| D | 7 | 116.20 | −452.37 | Air | 226.38 |
|   | 8 | 18.00 | −303.95 | Ge | 232.22 |

*Maximum Field Angle at Entrance Pupil = 46.3°

TABLE II

Approximate R.M.S. Spot Sizes in Object Space (in milliradians)

| Field | Monochromatic at 9.6 microns | *Chromatic over 8.5–11.5 microns |
|---|---|---|
| Axial | 0.038 | 0.041 |
| ⅓ | 0.049 | 0.059 |
| ⅔ | 0.055 | 0.067 |
| Full | 0.085 | 0.088 |

*Given as an equally weighted three wavelength accumulated measurement, the wavelengths being 8.5, 9.6 and 11.5 microns.

TABLE III

| Lens | Surface | Separation | Radius of Curvature | Material | Aperture Diameter |
|---|---|---|---|---|---|
| Entrance Pupil* | φ | 0 | Flat | Air | 11.30 |
| A | 1 | 23.66 | −76.99 | Air | 43.79 |
|   | 2 | 9.85 | −51.00 | Ge | 49.06 |
| B | 3 | 1.05 | 49.89 | Air | 47.91 |
|   | 4 | 19.86 | 42.57 | Ge | 33.75 |
| C | 5 | 167.03 | −549.66 | Air | 98.12 |
|   | 6 | 16.00 | −2921.41 | As/Se/Ge(BSI) | 103.86 |
| D | 7 | 125.11 | −369.82 | Air | 193.92 |
|   | 8 | 19.65 | −261.56 | Ge | 201.40 |

*Maximum Field Angle at Entrance Pupil = 72°

TABLE IV

Approximate R.M.S. Spot Sizes in Object Space (in milliradians)

| Field | Monochromatic at 9.6 microns | *Chromatic over 8.5–11.5 microns |
|---|---|---|
| Axial | 0.049 | 0.058 |
| ⅓ | 0.074 | 0.088 |
| ⅔ | 0.080 | 0.103 |
| Full | 0.178 | 0.195 |

*Given as an equally weighted three wavelength accumulated measurement, the wavelengths being 8.5, 9.6 and 11.5 microns.

TABLE V

| Material | V-value | Refractive index* |
|---|---|---|
| BS2 | 248 | 2.856 |
| BSA | 209 | 2.779 |
| TI 1173 | 142 | 2.600 |
| AMTIR | 169 | 2.497 |
| BS1 | 152 | 2.491 |
| TI 20 | 144 | 2.492 |
| KRS 5 | 250 | 2.370 |

TABLE V-continued

| Material | V-value | Refractive index* |
|---|---|---|
| CSI | 316 | 1.739 |
| CS Br | 176 | 1.663 |
| KI | 137 | 1.620 |

*The refractive index is for 10 microns, at 20° C.

In the foregoing table, the first seven material designations are the standard, conventional code designations used by manufacturers of infrared transmitting materials, including for example, the Barr and Stroud Limited Type 1, Type 2 and Type A materials having the designations BS1, BS2 and BSA in the above table, and the last three entries are standard abbreviations for chemical names, namely caesium iodide (CSI), caesium bromide (CS Br) and potassium iodide (KI).

What is claimed is:

1. An afocal refractor telescope formed by a fixed focus achromatic objective system and a fixed focus eyepiece system aligned on a common optical axis and arranged to provide an internal real image, said objective system being formed by two lens elements and said eyepiece system being formed by two lens elements, each of the four lens elements being made of a material which has a useful spectral bandpass in the infrared wavelength region, and having refractive surfaces intercepting said optical axis which are substantially spherical, that one of the objective system lens elements which is proximal the eyepiece system being colour corrective, with a V-value of not less than 120, negatively powered, and having a lower refractive index than the other objective system lens element which is positively powered.

2. A telescope as claimed in claim 1, wherein said other objective lens element has a refractive index at a temperature of 20° C. of not less than 4.0.

3. A telescope as claimed in claim 1, wherein said one objective system lens element is of low optical power and is mounted for movement along the optical axis, each of the other lens elements being fixedly mounted, and means are provided for moving said one objective system lens element whereby the telescope can be compensated against thermal variations or adjusted for focus.

4. A telescope as claimed in claim 1, wherein said one objective system lens element at a temperature of 20° C. has a refractive index at a wavelength of 10 microns not less than 2.45, each of the other lens elements having a refractive index at a temperature of 20° C. not less than 4.0.

5. A telescope as claimed in claim 1, wherein one or more of said refracting surfaces has an anti-reflection coating.

6. A telescope as claimed in claim 5, wherein said one objective system lens element is made of Chalcogenide glass and each of the other lens elements is made of germanium and at a wavelength of 10 microns the telescope transmits at least 60% of the incident radiation.

7. A telescope as claimed in claim 1, wherein the radius of curvature of each refractive surface is given together with the aperture diameter of each surface and of the telescope exit pupil the position of which pupil is used as a datum from which the separation of successive refractive surfaces is defined, together with the nature of the material relevant to each such separation interval in the following table:

| Item | Surface | Separation | Radius of Curvature | Material | Aperture Diameter |
|---|---|---|---|---|---|
| Exit Pupil | — | — | Flat | Air | 15.50 |
| 1st lens element | 1st surface | 36.00 | −169.06 | Air | 46.31 |
| | 2nd surface | 5.74 | −77.22 | Ge | 47.77 |
| 2nd lens element | 1st surface | 7.60 | 44.96 | Air | 42.83 |
| | 2nd surface | 20.20 | 32.77 | Ge | 27.37 |
| 3rd lens element | 1st surface | 207.56K | −549.66K | Air | 128.30K |
| | 2nd surface | 12.50K | −1,440.92K | BSI | 133.76K |
| 4th lens element | 1st surface | 116.20K | −452.37K | Air | 226.38K |
| | 2nd surface | 18.00K | −303.95K | Ge | 232.22K | wherein numerical data is given in millimeters and negative radius of curvature denotes that the center of curvature is on the exit pupil side of the surface whereas positive radius of curvature denotes that the center of curvature is on the side of the surface remote from the exit pupil, and K is a constant scale factor which is preselected in numerical value within the range 0.40 to 2.25.

8. A telescope as claimed in claim 1, wherein the radius of curvature of each refractive surface is given together with the aperture diameter of each surface and of the telescope exit pupil the position of which pupil is used as a datum from which the separation of successive refractive surfaces is defined, together with the nature of the material relevant to each such separation interval in the following table:

| Item | Surface | Separation | Radius of Curvature | Material | Aperture Diameter |
|---|---|---|---|---|---|
| Exit Pupil | — | — | Flat | Air | 11.30 |
| 1st lens element | 1st surface | 23.66 | −76.99 | Air | 43.79 |
| | 2nd surface | 9.85 | −51.00 | Ge | 49.06 |
| 2nd lens element | 1st surface | 1.05 | 49.89 | Air | 47.91 |
| | 2nd surface | 19.86 | 42.57 | Ge | 33.75 |
| 3rd lens element | 1st surface | 167.03K | −549.66K | Air | 98.12K |
| | 2nd surface | 16.00K | −2,921.41K | BSI | 103.86K |
| 4th lens element | 1st surface | 125.11K | −369.82K | Air | 193.92K |
| | 2nd surface | 19.65K | −261.56K | Ge | 201.40K | wherein numerical data is given in millimeters and negative radius of curvature denotes that the center of curvature is on the exit pupil side of the surface whereas positive radius of curvature denotes that the center of curvature is on the side of the surface remote from the exit pupil, and K is a constant scale factor which is preselected in numerical value within the range 0.55 to 2.65.

* * * * *